Patented Apr. 10, 1951

2,548,486

UNITED STATES PATENT OFFICE 2,548,486

PRODUCTION OF INDUSTRIAL GAS

Charles S. Lynch, Plainfield, N. J., assignor to Standard Oil Development Company, a corporation of Delaware No Drawing. Application November 15, 1946, Serial No. 710,236

3 Claims. (Cl. 48—196)

The present invention is directed to a method for converting hydrocarbon gases into industrial gases containing carbon monoxide and hydrogen.

It has already been proposed to convert hydrocarbon gases, such as methane, into valuable industrial gases containing carbon monoxide and hydrogen by reacting the hydrocarbon gas with a metal oxide capable of giving up oxygen at the temperature of operation. Various metal oxides have been proposed for use in this operation. The extent of hydrocarbon conversion and the selectivity of the conversion with respect to carbon monoxide varies to a large extent with the individual oxides. From the point of view of selectivity, zinc oxide has been shown to be the most effective of the oxides. Zinc oxide, however, has not become commercially important in this operation because at the temperature at which it will give up its oxygen the zinc vaporizes, giving rise to costly losses and extensive corrosion.

The present invention is based on the discovery that, if iron oxide or metallic iron is mixed with zinc oxide, much higher conversions of hydrocarbon without any substantial loss in selectivity are effected at lower temperatures at which the vaporization of the zinc is minimized or eliminated. The iron is conveniently added to the zinc in the form of any of the iron oxides, although it may be added in the form of metallic iron. When iron oxide is employed, the extent of hydrocarbon conversion increases with time of operation, indicating that the greatest effectiveness is realized when the mixture contains free iron. It follows that any reducible iron compound may be employed in this relation.

The process may be carried out either by employing a fixed bed of oxygen carrier or a moving bed or a fluidized suspension of the oxygen carrier in finely divided form. The latter type of operation is preferred from the point of view of continuity. In this type of operation two vessels are employed, the one being the reactor and the other a regenerator. A mixture of finely divided zinc oxide and iron oxide or iron, as the case may be, is continuously fed to the reactor to which is simultaneously fed the hydrocarbon to be converted. The hydrocarbon is fed upwardly through the reactor at a rate sufficient to maintain the powdered oxygen carrier in dense suspension therein. By dense suspension is meant one containing at least about 6% by volume of powdered solid, generally between 10 and 25% by volume. In order to achieve this type of suspension it is necessary to use the solid oxygen carrier in the form of finely divided particles of various particle sizes ranging upwardly from about 5 microns and predominantly passing 100 mesh.

In the continuous fluidized solid type of operation fluidized solid is continuously withdrawn from the reactor and fed to the regenerator where it is reacted with an oxidizing gas. The fluidized regenerated solid flows back to the reactor.

The amount of iron or reducible iron compound, such as iron oxide, employed may vary over fairly wide limits. A substantial reduction in the temperature required to effect a given conversion of the hydrocarbon results when 5% by weight of iron oxide, $Fe_2O_3$, is mixed with the zinc oxide. This reduction in temperature is increased without a substantial reduction in the selectivity of the reaction toward carbon monoxide with increasing addition of iron oxide up to about 20%.

In general, the process is conducted at a temperature between about 1500° and 1700° F. The operating pressure may vary within wide limits, extending upwardly from atmospheric to any desired pressure. For practical purposes the upper limit of pressure is about 600 lbs./sq. in. It is preferred to operate at the higher pressures because the higher the pressure the higher the permissible temperature without vaporization of zinc. Very effective operating conditions include a temperature between 1600 and 1700° F. and a pressure between 300 and 500 lbs./sq. in. The rate of flow of the hydrocarbon through the oxygen carrier may also vary within wide limits, from about 20 v./v./hr. to 500 v./v./hr. Ordinarily this rate of flow will be between about 70 v./v./hr. and 200 v./v./hr.

The nature of the improvement effected by the present invention will appear from the following comparative tables:

Oxidation of methane with ZnO

[At 100 v./v./hr.]

| Temperature, °F | 1500 | 1600 | | 1700 |
|---|---|---|---|---|
| Minutes on Stream | 45 | 25 | 60 | 20 |
| Methane Conversion, Per Cent | 4.5 | 16.9 | 15.4 | 53.5 |
| Selectivity, Per Cent: | | | | |
| CO | 100 | 100 | 75 | 96 |
| $CO_2$ | 0 | 0 | 5 | 4 |
| C | 0 | 0 | 20 | 0 |

By selectivity with respect to any one of the products CO, $CO_2$ or carbon is meant the per cent of the methane converted which is converted to the particular product.

The results employing 90% ZnO–10% Fe$_2$O$_3$ are shown in the following table:

*Oxidation of methane with 90% ZnO–10% Fe$_2$O$_3$*

[At 100 v./v./hr.]

| Temperature, °F | 1500 | | | 1600 | | |
|---|---|---|---|---|---|---|
| Minutes on Stream | 30 | 90 | 134 | 31 | 61 | 89 |
| Methane Conversion, Per Cent | 7 | 18 | 35.6 | 25.6 | 32.8 | 52.2 |
| Selectivity, Per Cent: | | | | | | |
| CO | 29 | 93 | 100 | 98 | 98 | 98 |
| CO$_2$ | 71 | 7 | 0 | 2 | 2 | 2 |
| C | 0 | 0 | 0 | 0 | 0 | 0 |

From these tables it will be observed that it is possible to secure a much greater conversion of methane at a given temperature without any noticeable loss in selectivity by mixing iron oxide with the zinc oxide. It is to be noted that as the time of operation increases in the case of the iron oxide mixture, the conversion increases without loss of selectivity. This indicates that an increase in effectiveness results from the conversion of iron oxide to iron. It is also worthy of note that, while the employment of iron oxide alone as an oxygen carrier usually results in the formation of large quantities of carbon, the mixture of zinc oxide and iron oxide, even over a long on-stream period, causes no carbon formation. Indeed, with zinc oxide alone, when the on-stream operation was extended to 1600° F., substantial carbon formation occurred.

The nature and objects of the present invention having thus been set forth and specific examples of the same given, what is claimed as new and useful and desired to be secured by Letters Patent is:

1. A method for converting a hydrocarbon gas into an industrial gas containing carbon monoxide which comprises continuously feeding said hydrocarbon to a reaction zone, continuously feeding to said zone a finely divided mixture of zinc oxide and a substance selected from the group consisting of iron and reducible oxygenated iron compounds, the zinc oxide amounting to 85 to 95% of the mixture regulating the rate of feed of said finely divided material and the rate of feed of said hydrocarbon so as to maintain in said reaction zone a suspension of said finely divided material in the gaseous atmosphere therein containing at least about 6% by volume of said finely divided material, maintaining said reaction zone at a temperature between about 1500° and 1700° F. and withdrawing from the said reaction zone a product gas containing carbon monoxide.

2. A method according to claim 1 in which the substance mixed with the zinc oxide is iron oxide.

3. A method according to claim 1 in which the substance mixed with zinc oxide is iron oxide and the zinc oxide constitutes between about 85% and about 95% of the mixture.

CHARLES S. LYNCH.

REFERENCES CITED

The following references are of record in the file of this patent:

UNITED STATES PATENTS

| Number | Name | Date |
|---|---|---|
| 1,899,184 | De Simo | Feb. 28, 1933 |
| 1,961,424 | Maier | June 5, 1934 |